United States Patent [19]

Bishop

[11] 4,252,204
[45] Feb. 24, 1981

[54] WALKING DRAG LINE

[75] Inventor: John N. Bishop, Farmington, N. Mex.

[73] Assignee: Varian Associates, Palo Alto, Calif.

[21] Appl. No.: 27,997

[22] Filed: Apr. 9, 1979

[51] Int. Cl.³ .............................................. B62D 57/02
[52] U.S. Cl. ........................................ 180/8 D; 305/1
[58] Field of Search .............. 180/8 R, 8 D, 8 C, 8 F; 305/1, 2

[56] References Cited

U.S. PATENT DOCUMENTS

| | | | |
|---|---|---|---|
| 1,287,086 | 12/1918 | Olsen | 180/8 B |
| 2,247,782 | 7/1941 | Martinson et al. | 180/8 D |
| 2,259,200 | 10/1941 | Cameron et al. | 180/8 D |
| 2,941,846 | 6/1960 | Hall et al. | 180/8 R |
| 3,114,425 | 12/1963 | Adams | 180/8 C |
| 3,249,168 | 5/1966 | Klein et al. | 180/8 C |
| 3,265,145 | 8/1966 | Beitzel | 180/8 D |
| 3,375,892 | 4/1968 | Kraschnewski et al. | 180/8 D |
| 3,500,945 | 3/1970 | Barden et al. | 180/8 C |
| 3,901,341 | 8/1975 | Stoldt | 180/8 D |

Primary Examiner—John J. Love
Assistant Examiner—Donn McGiehan
Attorney, Agent, or Firm—Stanley Z. Cole; Peter J. Sgarbossa

[57] ABSTRACT

A walking drag line having an oxcillating wheel segment, a vertical axis roller slot coupling the wheel segment and the walking drag line, a shoe for stepping the walking drag line and a track frame assembly coupling the oscillating wheel segment and the shoe. The crank-pin which is journalled into the wheel segment imparts a reciprocal motion in the wheel segment having both horizontal and vertical components. The wheel segment rotates about the axis of a roller axis pin journalled in the vertical axis roller slot and rotates on a track surface of the shoe on the curved outer surface of the wheel segment without slippage.

6 Claims, 15 Drawing Figures

PAGE PRIOR ART

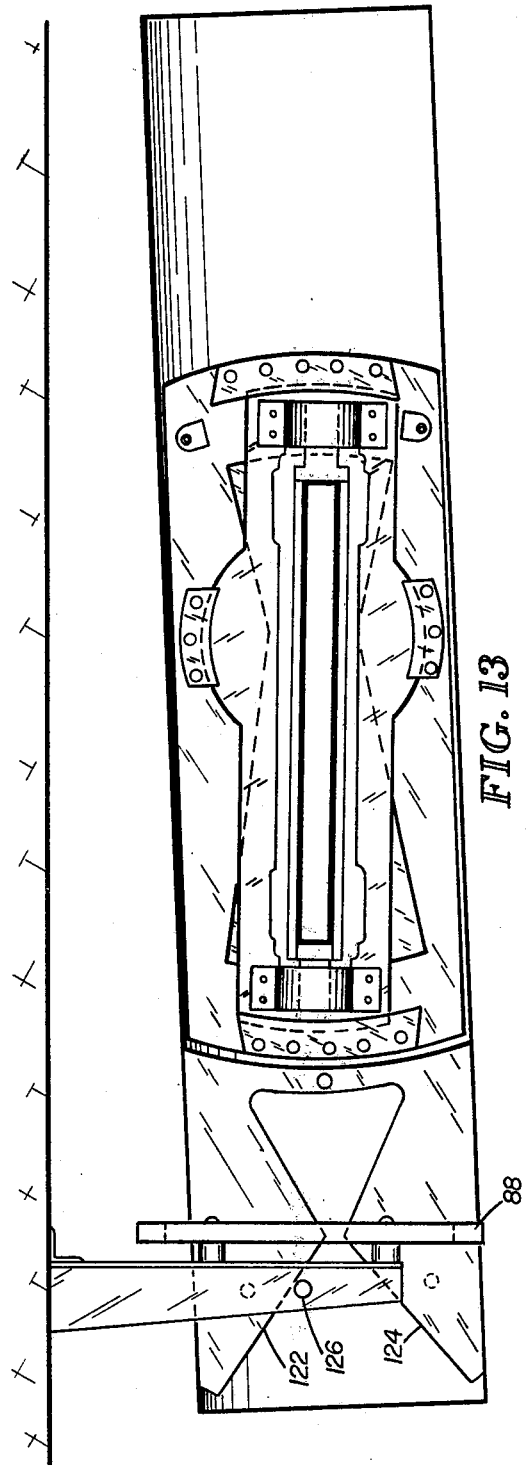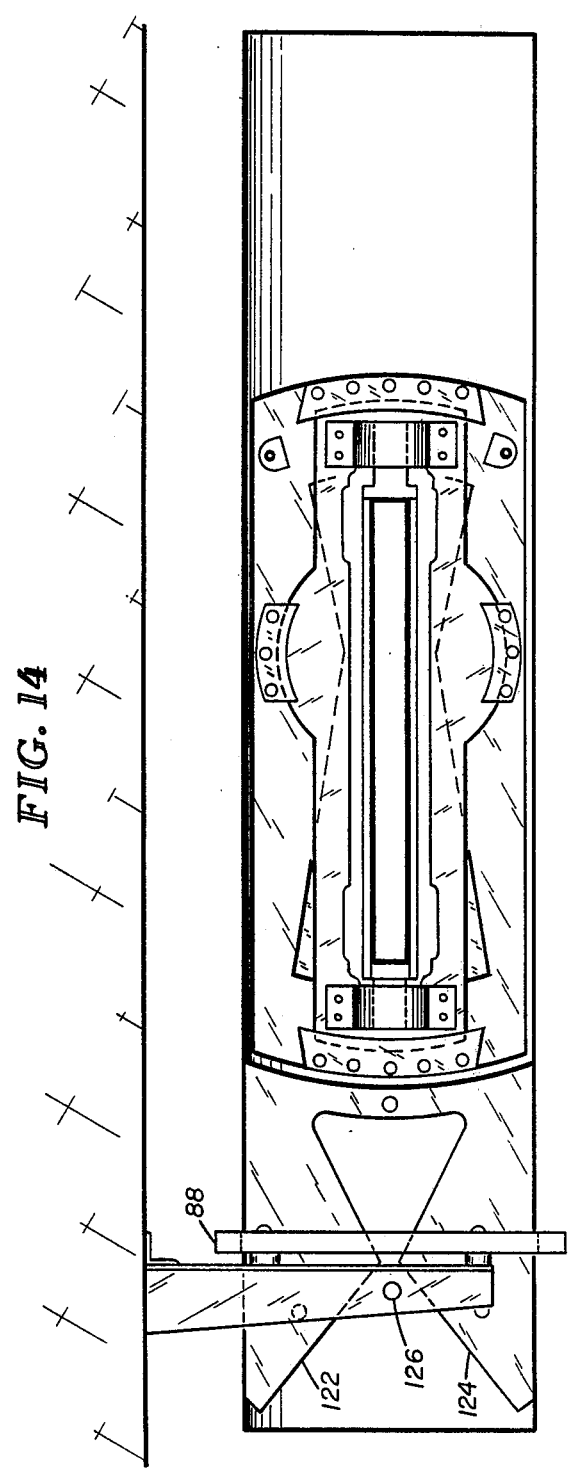
FIG. 13
FIG. 14

WALKING DRAG LINE

BACKGROUND OF THE INVENTION

The present invention pertains generally to walking devices and more particularly to walking devices for large machinery.

Many prior art designs exist for walking devices for large machinery such as disclosed in U.S. Pat. Nos.: 3,901,341, 3,265,145, 3,500,945, 3,114,425, 2,247,782, 2,259,200, 3,249,168, 3,375,892. However, the only known working mechanical devices are the Marion crankpin operated walking device schematically illustrated in FIG. 2, the Bucyrus Erie cam operated walking device schematically illustrated in FIG. 1, and the Page walking device schematically illustrated in FIG. 3. These devices suffer from various disadvantages and limitations.

A primary disadvantage of prior art walking devices relates to travel of the center of gravity of the drag line in a horizontal direction with respect to the lifting force. Each of the prior art devices begins its start of step, i.e., the initial lifting portion of the step, with the vertical lifting force a maximum distance (during its cycle of operation) from the center of gravity of the walking drag line. This causes tub drag weight to be maximized at the start of step position. Since power requirements for lifting the drag line are necessarily maximized at the start of step, and prior to art devices unavoidably impart a horizontal movement, in addition to the vertical lifting movement, an extremely undesirable power curve is generated. Ideally, for a more desirable power curve, the drag line should start the step with low tub drag and end the step with higher tub drag. This would allow the walking device to lift the drag line while imposing minimal resistance imparted by horizontal force vectors, while simultaneously imposing greater resistance to offset reverse loading incurred during the "set down" phase of operation.

Furthermore, maximum tub drag of the start of step causes a smaller percentage of the total weight of the drag line to be placed on the shoes before horizontal movement is initiated, as compared to a device having its vertical lifting force closer to the center of gravity of the drag line and consequently lessens tub drag. Resultant higher horizontal resistance forces generated by horizontal tub drag and lesser total weight placed on the shoes, increases the probability for shoe slippage. To increase weight on the shoes and decrease tub drag, prior art devices have shortened step length which decreases the horizontal distance of the lifting force from the center of gravity since step length varies proportionally with the distance of the lifting force from the center of gravity. This, however, is an unfavorable solution to the problems of an undesirable power curve and shoe slippage since speed of movement is significantly decreased due to shorter step length.

To maximize shoe ground clearance, prior art devices such as shown in FIGS. 1 through 3 use less than half of the available 360 degree shaft rotation to actually lift and cause the drag line to travel in a horizontal direction. Actually, only approximately 140 degrees of the crank shaft rotation is used to lift and move the drag line, resulting in a much less efficient use of the motive power of the device. Moreover, the Marion and Page walking devices schematically illustrated in FIGS. 2 and 3, generate forces on the drag line main structure in a direction opposite to the direction of travel, causing further inefficient power utilization and increased tub drag.

A primary disadvantage of the Bucyrus Erie and Marion walking devices illustrated in FIGS. 1 and 2 is that ground clearance of the structure required to support the crank shaft is minimal, e.g., approximately six feet. Of course, it is desirable to have greater ground clearance to enable bulldozers to operate close to the tub under the main frame when necessary. Since in both the Bucyrus Erie and Marion walking devices, ground clearance is directly related to the length of step, and since the length of step cannot be increased for larger machines due to power considerations, the maximum ground clearance of these devices is limited by their design.

Bearings have also created many problems in prior art larger machinery such as drag lines exceeding 6 million pounds and typically 12 million pounds or more. For example, increased friction and airborne abrasives have necessitated the use of outside bearings in larger machines designed to be used in the western United States. Other than the device described in U.S. Pat. No. 2,259,200, no previous devices were designed to utilize outside bearings. Even through the use of outside bearings and special lubricants, the Bucyrus Erie device illustrated in FIG. 1 is incapable of overcoming the friction problems of the skidding action of the cam within the cam race. The line contact between the cam and cam race, together with skidding action imposed by the cam, creates extremely high friction for the pressures imposed by drag lines exceeding 6 million pounds. Although a later design of the Bucyrus Erie device disclosed in U.S. Pat. No. 3,265,145 overcomes these problems of friction, the modified device has an inherently small step length.

Another disadvantage of prior art devices is that large drag lines require large components which cannot be made by casting or forging or as a stress relieved weldment. Due to the size of these components, they must be made as a fabricated weldment which cannot be stress relieved since they are too large to fit in stress relieving furnaces. For example, the Page model 757 drag line spud measures approximately 37.5 feet high, 12 feet wide, and weighs 89,000 pounds. As a result of the fabrication process, the strength of large prior art components is marginal or insufficient, and failure of these parts in use, especially where ground conditions are less than optimum, is fairly common. In fact, present indications show that the largest excavators for which the Page walking device will operate is 8 million pounds due to the size, strength and weight barrier of fabrication for the spud component.

Shoe ground clearance is also a disadvantage of the Bucyrus Erie and Marion Devices illustrated in FIGS. 1 and 2. Since ground clearance in these devices is a function of cam crankshaft operating radius and consequently step length, in larger devices the step length must be significantly reduced to overcome frictional problems in bearings, undesirable power curves, and shoe slippage. Hence, shoe clearance must be proportionally reduced. The ability to step over uneven ground, impediments such as rocks or stumps, or lift the drag line if it sinks into the ground, while operating in one location for several hours, is therefore reduced.

Similarly, low tub lift height provided by the prior art devices generates greater tub drag and its resultant disadvantages and limitations when used in loose surface conditions prevalent in western surface mining, due to the build-up of several inches or more of ground beneath the dragging side of the tub, consequently increasing tub drag surface area. A higher tub lift would, of course, decrease the area of ground contact.

Another disadvantage of the prior art devices, especially the Bucyrus Erie device illustrated in FIG. 1 and the Page device illustrated in FIG. 3, is that these devices operate by lifting the machine on one radius and moving the machine across the ground by use of a second radius. Use of this twin radius concept places uncentered loads of varying intensity on related walking device components. The result of these eccentricities is a twisting load of great magnitude applied to various components causing frictional problems, and often times, failure of these components.

Another disadvantage of the prior art devices is that the drag line travels across unlevel walking surfaces thereby causing the drag line to slant to one side. This imposes tremendous binding or twisting loads on the cam crank bearing of the Marion device shown in FIG. 2 and large loads on both the cam and cam race of the Bucyrus Erie device shown in FIG. 1. As a result, the Bucyrus Erie and Marion devices have practically no ability to withstand side loading imposed by unlevel walking roads.

Differences between ground elevation and elevation under the shoes causes additional problems with the prior art devices. For example, if the ground elevation under the shoes is less than the ground elevation under the tub, the step length is considerably shortened, and less of the 140° of crank shaft operating radius is used to step the device. As a result, the shoes tend to slip since horizontal movement of the shoes is well underway by the time the shoes contact the ground. Additionally, less tub lifting height under the circumstances causes greater horizontal resistance for the reasons set forth above.

On the other hand, greater elevation under the shoes relative to the ground elevation under the tub causes the stepping length to be extended beyond design parameters. This causes sudden inordinate demand for power at the start of step which causes the prior art devices to overload or stall the walking motors.

SUMMARY OF THE INVENTION

The present invention overcomes the disadvantages and limitations of the prior art by providing an improved walking device. According to the present invention, a segment of a large wheel is utilized which rotates in a reciprocal manner on its outer surface. The axis point of the wheel segment is journalled in a vertical axis roller slot to also permit vertical movement of the wheel segment. Both horizontal and vertical movement of the wheel segment is induced by an eccentrically mounted crank pin journalled in the wheel segment. Since the outer surface of the wheel segment rotates on the shoe, no slippage points exist to cause frictional problems. Additionally, the vertical lifting force of the walking device of the present invention does not move relative to the center of gravity of the machinery being lifted during the stepping motion, thereby eliminating problems associated with a vertical force vector which moves with respect to the center of gravity.

It is therefore an object of the present invention to provide an improved walking device.

It is also an object of the present invention to provide a walking device having minimal shoe slippage.

Another object of the present invention is to provide a walking device having a desirable power curve.

Another object of the present invention is to provide a walking device having a large shoe ground clearance.

Another object of the present invention is to provide a walking device which uses a large portion of the crank shaft rotation for stepping the walking machinery.

Another object of the present invention is to provide a walking device which provides efficient power utilization.

Another object of the present invention is to provide a walking device with maximum design crankshaft clearance.

Another object of the present invention is to provide a walking device capable of taking 50 to 100% larger steps than prior art devices.

Consequently, the walking shaft can be revolved slower than shafts of prior art devices. This lowers bearing loadings and power requirements, while maintaining a faster travelling speed.

Another object of the present invention is to provide a walking device which has outside lubrication bearings.

Another object of the present invention is to provide a walking device which has minimal frictional problems.

Another object of the present invention is to provide a walking device utilizing components fabricated to withstand heavy loadings.

Another object of the present invention is to provide a walking device which provides high tub lift.

Another object of the present invention is to provide a walking device which minimizes twisting loads.

Another object of the present invention is to provide a walking device which has the ability to tolerate side loading.

Another object of the present invention is to provide a walking device capable of withstanding differences of ground elevation under the shoes and tub.

Other objects and further scope of applicability of the present invention will become apparent from the detailed description given hereinafter. The detailed description, indicating the preferred embodiment of the invention is given only by way of illustration since various changes and modifications within the spirit and scope of the invention will become apparent to those skilled in the art from the detailed description. The abstract of the disclosure is for the purpose of providing a non-legal brief statement to serve as a searching and scanning tool for scientists, engineers, and researchers and is not intended to limit the scope of the invention as disclosed herein, nor is it intended to be used in interpreting or in any way limiting the scope or fair meaning of the appended claims.

BRIEF DESCRIPTION OF THE DRAWINGS

FIG. 13 is a top view of a shoe of the walking device of the present invention in an off-axis position;

FIG. 14 is a top view of a shoe of the walking device of the present invention which is properly centered.

DETAILED DESCRIPTION OF THE PREFERRED EMBODIMENT OF THE INVENTION

Figure 1:
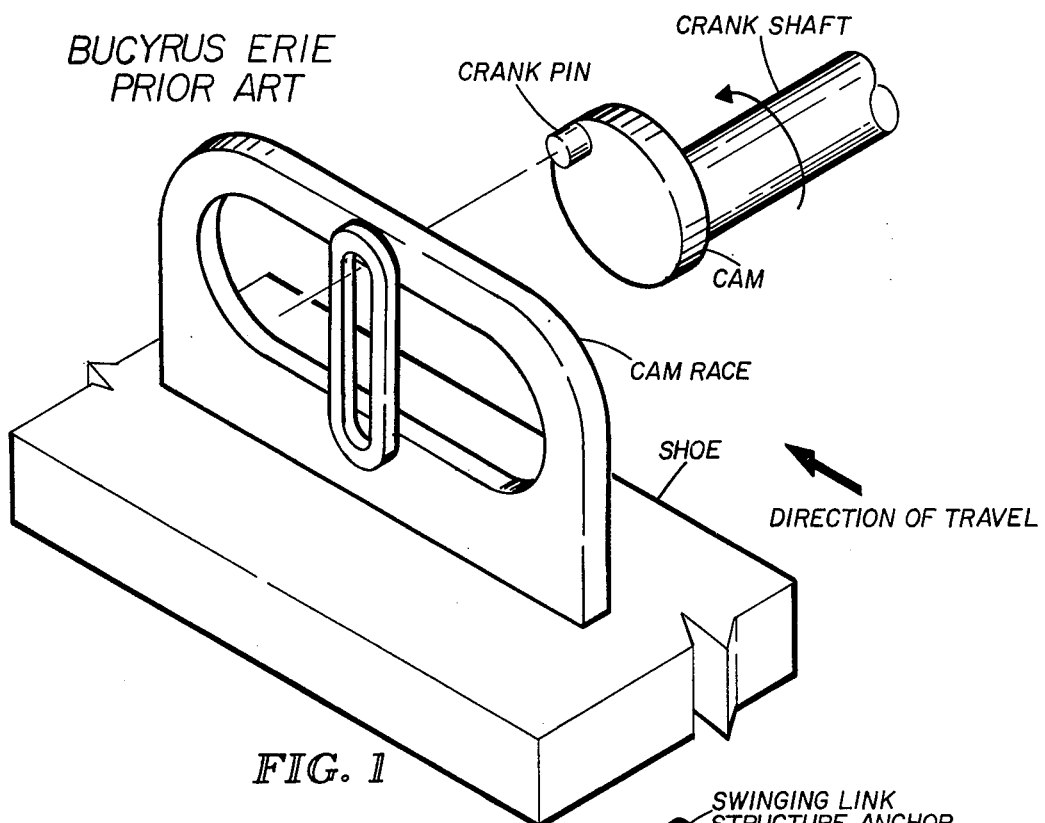
FIG. 1 is a schematic illustration of a prior art walking device produced by Bucyrus Erie.
Figure 2:
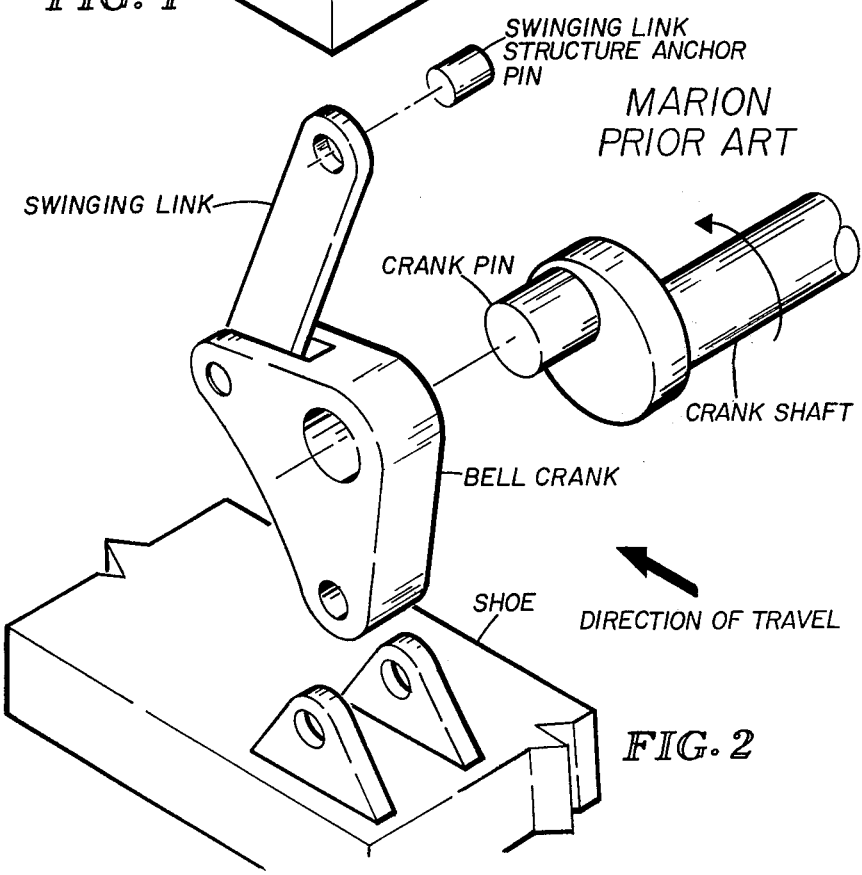
FIG. 2 is a schematic illustration of a prior art walking device produced by Marion.
Figure 3:
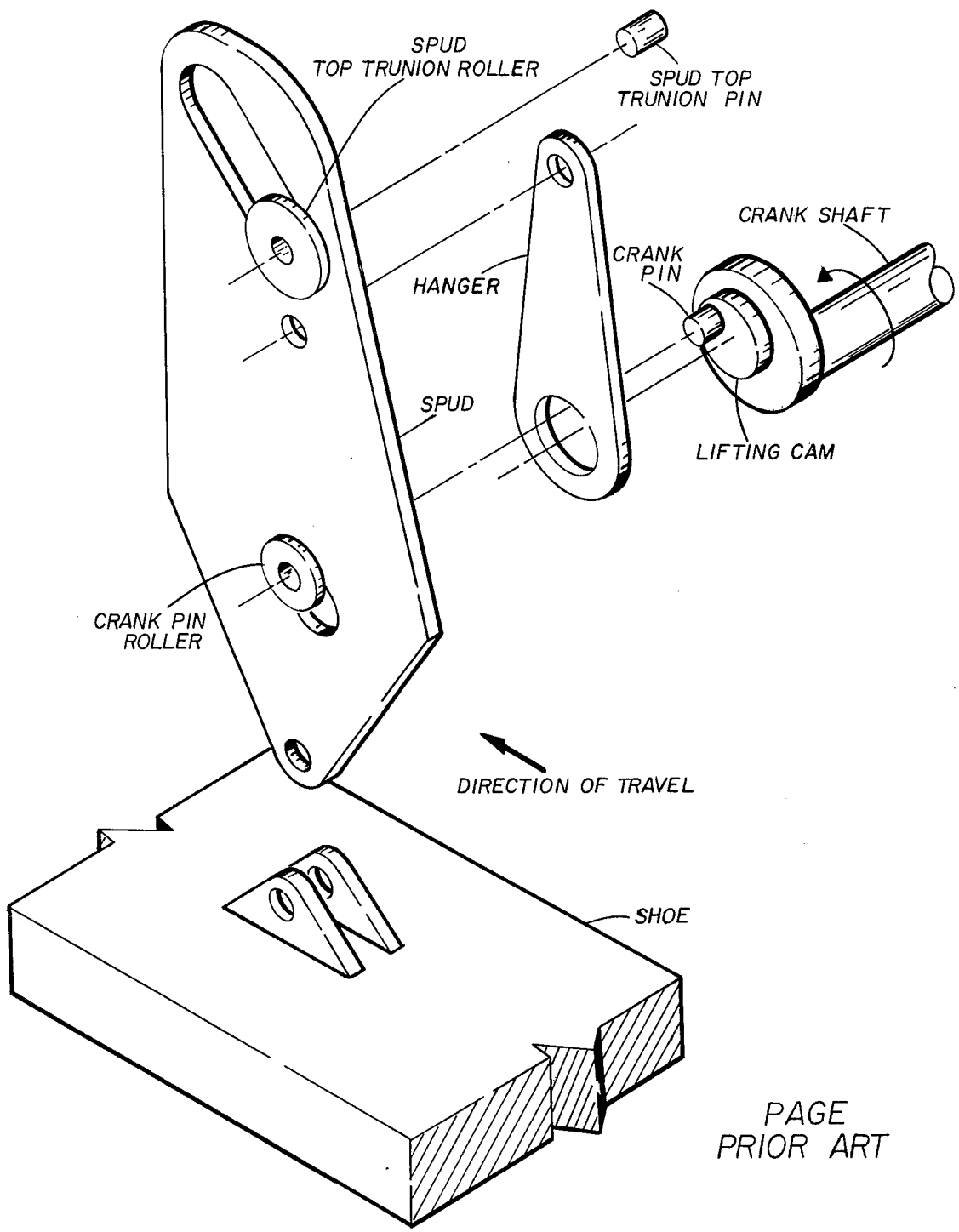
FIG. 3 is a schematic illustration of a prior art device produced by Page.
Figure 4:
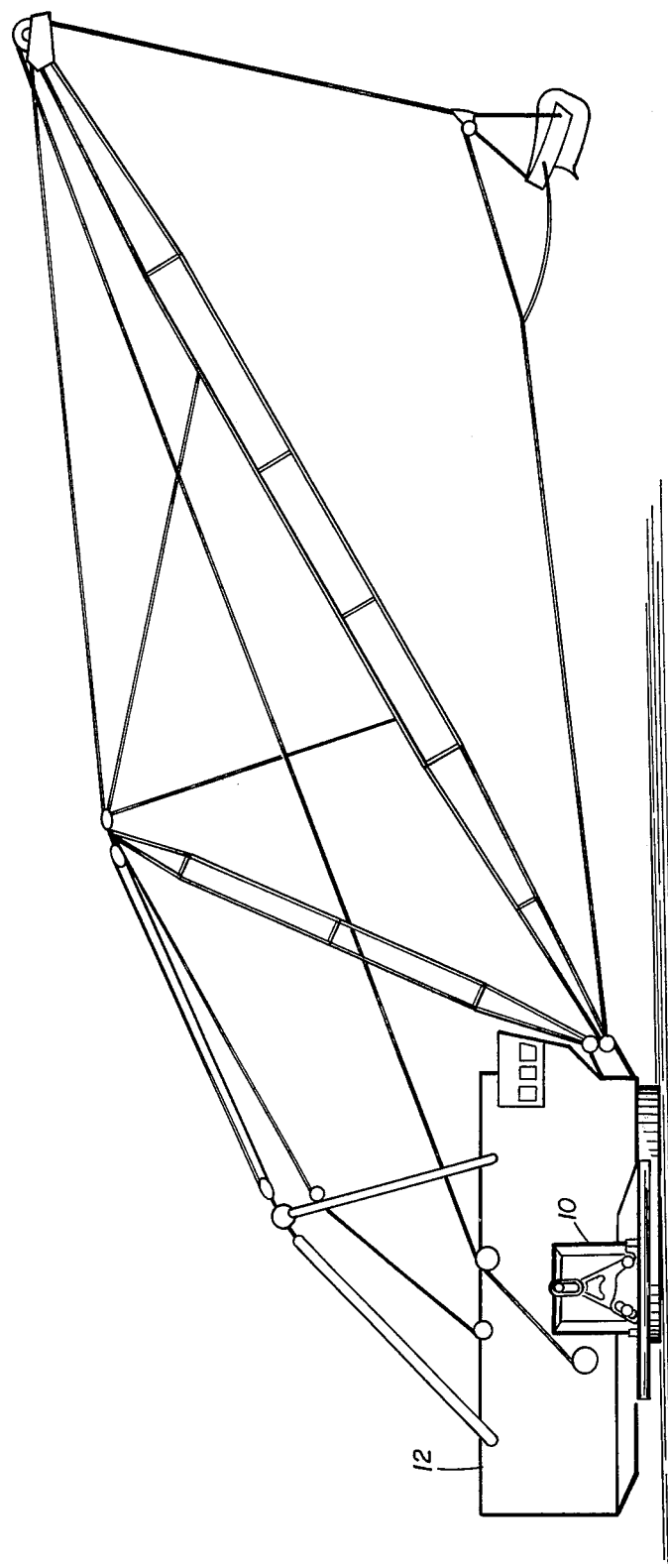
FIG. 4 is a schematic illustration of a conventional drag line utilizing the walking device of the present invention.

FIG. 4 illustrates a conventional walking drag line 12 and placement of the walking device 10 of the present invention with respect to the drag line. Although a drag line is illustrated in FIG. 4, the walking device of the present invention can be used with any large machinery to displace or move the machinery across the ground. In fact, the device of the present invention could be used to move any type of machinery such as machinery used in space exploration including instrument carriers, transporters, etc., where planetary surface conditions or gravitational fields might negate the use of wheeled or tracked vehicles.

Figure 5:
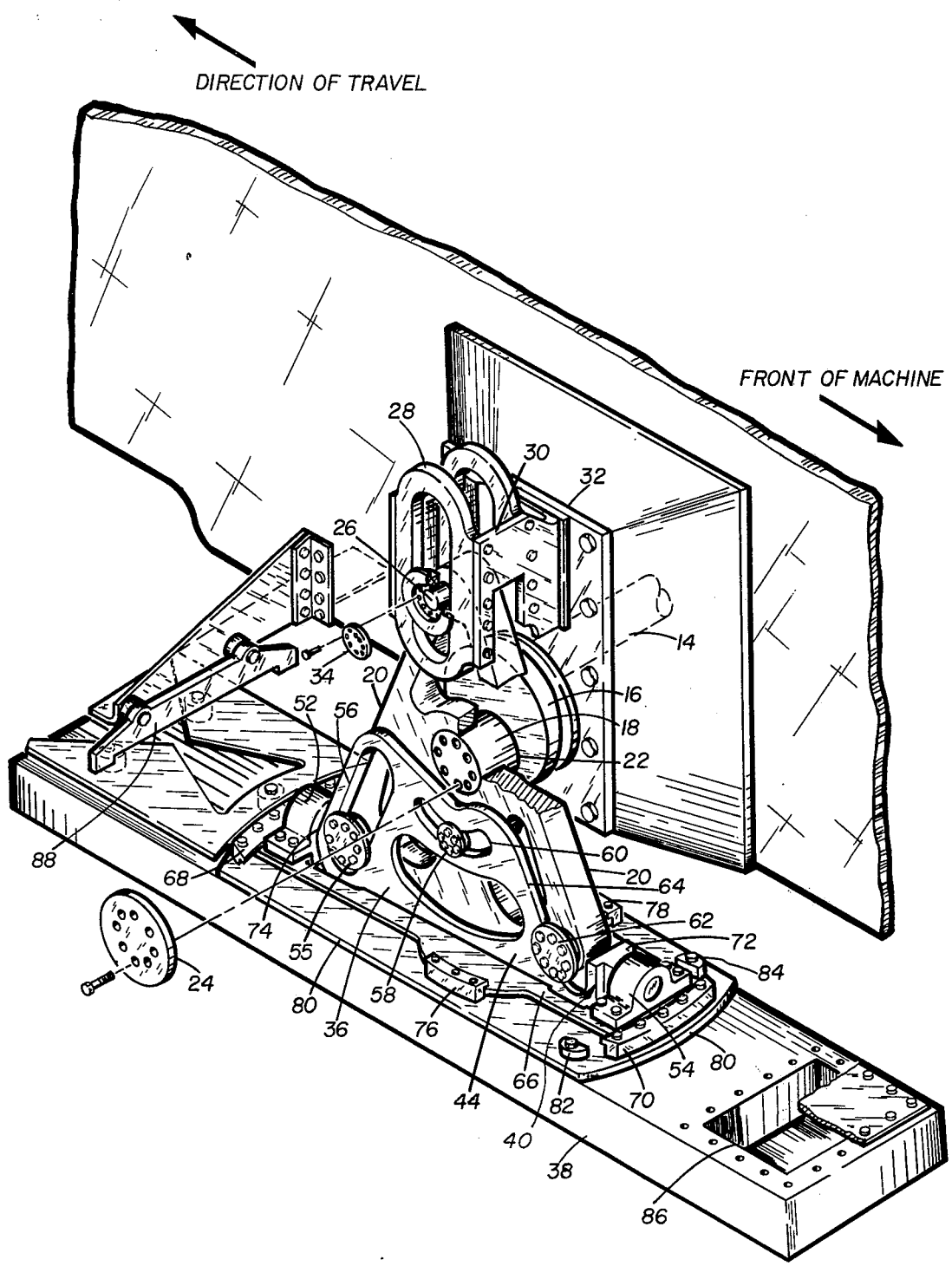
FIG. 5 is a perspective view schematically illustrating the walking device of the present invention.

FIG. 5 is a perspective view illustrating the primary components of the walking device of the present invention. Crank shaft 14 is driven internally within the drag line and produces rotary motion in crank web 16 and eccentrically mounted crank pin 18. Crank pin 18 is journalled in wheel segment 20 which constitutes a section or segment of a very large wheel having a prototype diameter of approximately 45 feet. At the point where the crank pin 18 is journalled to wheel segment 20, a crank pin bearing 22 is mounted to carry the heavy loading between the crank pin 18 and wheel segment 20. Flange 24 secures the crank pin 18 to the wheel segment 20.

Eccentric motion of the crank pin causes the wheel segment 20 to move vertically while oscillating in a reciprocal motion about roller axis pin 26. Roller axis pin 26 comprises a shaft with flanged rollers to eliminate sliding friction between roller axis pin 26 and axis roller slot 28. Alternatively, the pin 26 could be fixed to the wheel segment with rollers rotating on its exterior. The axis roller slot 28 is attached at the desired location to the drag line by way of attachment plates 30 and 32. Flange 34 is utilized to hold roller axis pin 26 within the axis roller slot 28.

Figure 15:
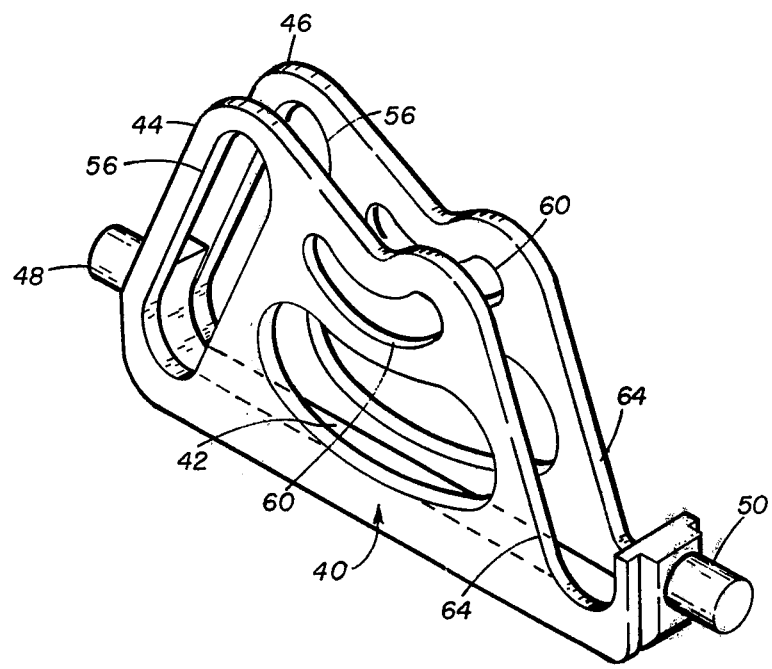
FIG. 15 is a perspective view of the track frame assembly.

Track frame assembly 36 functions to couple the wheel segment 20 to shoe 38. The track frame assembly is more clearly shown in FIG. 15. Track frame assembly 36 consists of a lower track assembly 40 having a surface 42 on which the outer wheel segment surface rolls during the stepping motion, and an upper assembly comprising track frame side plates 44 and 46. Rear trunnion journal 48 and front trunnion journal 50 are attached to the track frame lower assembly 40. Rear trunnion journal 48 is mounted in rear trunnion bearing 52 while front trunnion journal 50 is mounted in front trunnion bearing 54. Trunnion bearings provide sideways movement of the shoe 38 to compensate for uneven surface conditions. The height of the track frame side plates 44 and 46 gives added valuable trussing to the lower assembly 40 between the trunnion bearings 52 and 54. Alternatively, one or more intermediate half bearings can be used, if necessary, to load the lower assembly 40 to give additional support. In fabrication, the lower assembly 40 can be constructed by forging or casting while the track frame side plates 44 and 46 can be fabricated by castings or built-up weldments. Attachment of the track frame side plates 44 and 46 to the lower assembly 40 can be accomplished by either bolting or doweling.

Referring again to FIG. 5, synchronizer roller 55, attached to wheel segment 20, is journalled in the synchronizer roller slot 56 of track frame side plates 44 and 46. The synchronizer roller slot 56 is contoured to match the rolling motion of the wheel segment 20 along track surface 42 to prevent slip, skid or spin of the wheel segment 20 during the stepping motion. During shoe return the synchronizer roller forces shoe 38 back for the next step by moving within the synchronizer roller slot 56. Flanges are provided on the synchronizer roller to prevent side play and, consequently, rubbing of the wheel segment against other parts of the device.

Shoe lift roller 58 is mounted in shoe lift roller slot 60 in the same manner as described above. The shoe lift roller functions to lift the track frame side plates 44 and 46 and, consequently, the shoe 38 during the 270° to 90° portion of operation. Flanges are also provided on the shoe lift roller to prevent undesirable side movement.

Stabilizer roller 62 which is also mounted on wheel segment 20 provides stabilization between the wheel segment 20 and track frame assembly 36. Stabilizer roller 62 moves along surface 64 of the track frame assembly 36 during operation. Flanges are provided on the stabilizer roller to control side movement and prevent rubbing of the wheel segment against the track frame assembly 36.

Base plate 66 provides a plate to which the rear trunnion bearing block 52 and front trunning bearing block 54 are attached. As shown, a slot is provided in the base plate 66 to accommodate the downward projection of wheel segment 20 and track frame assembly 36. However, the horizontal center line of the trunnion bearings 52 and 54 can be raised to eliminate the need for this slot. Alternatively, the base plate could be entirely eliminated by widening the sides of the trunnion bearing blocks 52 and 54 and lengthening the front and/or rear edges to provide an engagement surface with front shear lip block 70 and/or rear shear lift block 68 and providing a saddle-type center half bearing beneath the wheel segment track frame assembly.

The trunnion bearing blocks 52 and 54 provide attachment points of the track frame assembly 36 to the shoe. Trunnion bearing blocks 52 and 54 must support heavy loadings when the drag line main frame is being lifted and dragged in the direction of travel indicated in FIG. 5. In addition to these vertical loadings, reasonably heavy horizontal loadings are applied to the trunnion bearing blocks 52 and 54, especially when the drag line is moving along uneven surfaces. The design of the walking device of the present invention allows the fabricator to use bearing blocks and bearings large enough to accommodate encountered loads without space limitations.

The trunnion bearing thrust plates 72 and 74, which are similar to large washers, are disposed between the attachment of rear trunnion journal 48 and front trunnion journal 50 to the track frame lower assembly 40, the trunnion bearing blocks 50 and 54. Trunnion bearing thrust plates 72 and 74 spread horizontal thrust over a large area of the bearing blocks 52 and 54.

Shear lip blocks 76 and 78 are contoured to match the front, rear and side radii of base plate 66 and are rigidly attached to the shoe top plate 80 with clearance to allow the shoe 38 to swivel at either end towards or away from the drag line center line. Lips on the shear lip block provide a means for lifting the shoe from the ground during shoe return. Shoe travel limiters 82 and 84 are provided to limit shoe swivel in the shear lip blocks.

The shoe top plate 80 can be provided separately or be used as an integral part of the shoe 38. Due to the very strong, heavy structure from which shoe 38 is conventionally constructed, need for a separate top plate 80 is not considered necessary.

The toe ballast compartment 86 is provided for the addition of ballast material to ensure that the shoe will always remain toe heavy, and to consequently cause the shoe stabilizer components to remain engaged during shoe return. Stabilizer bracket 88 functions to provide vertical stability to shoe 38 as well as to provide a centering mechanism to realign the shoe 38 during return.

FIGS. 6 through 12 illustrate the operation of the walking device 10 of the present invention.

Figure 6:
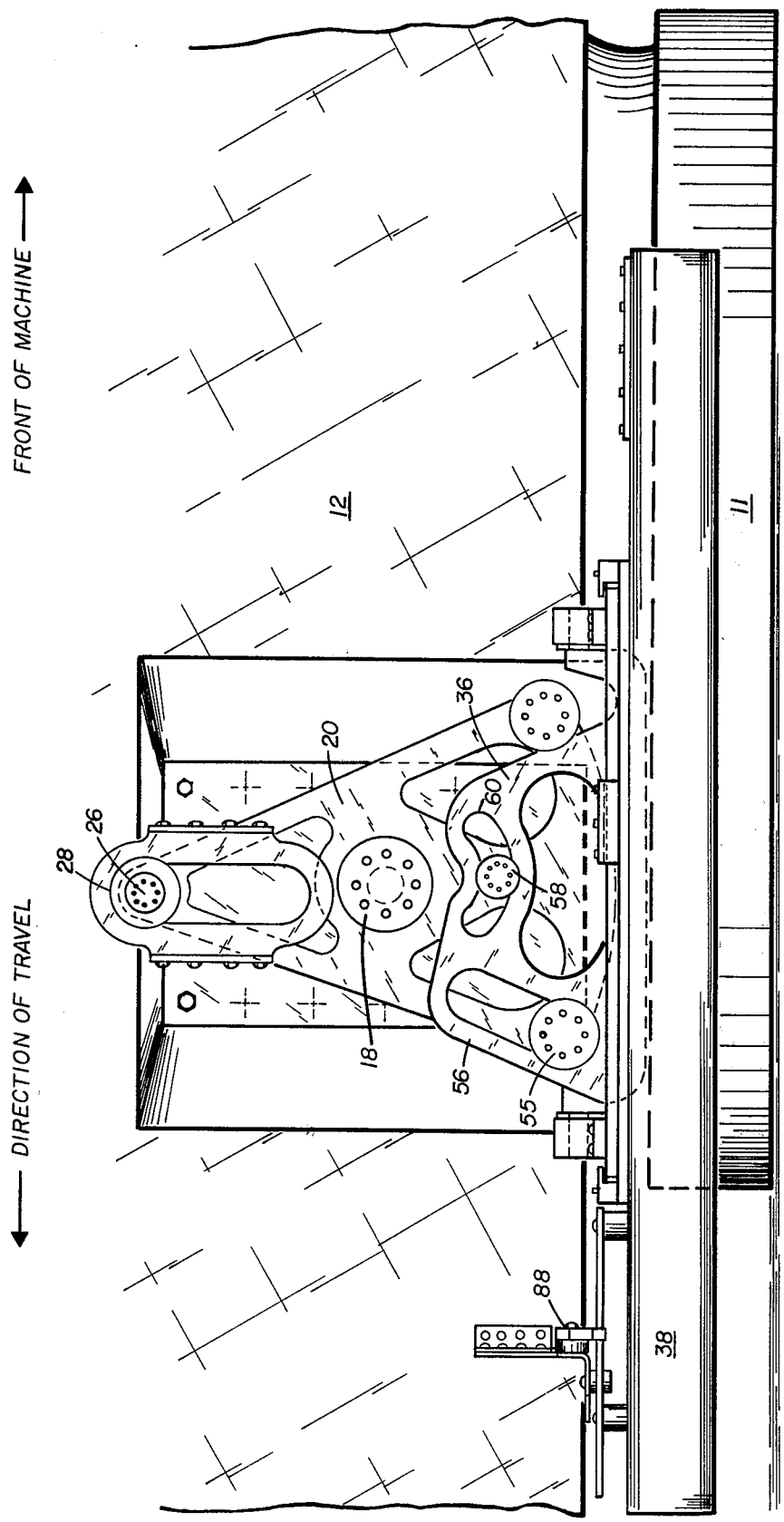
FIG. 6 is a side view of the walking device of the present invention at the shoe up or zero degree position.

FIG. 6 illustrates the walking device in the shoe up or zero degree crank pin position. The center line of crank pin 18 is directly above the center line of walking shaft 14. The wheel segment axis roller 26 is at the top of the axis roller slot 28. Shoe lift roller 58 is centered horizontally in the shoe lift roller slot 60. The weight of the shoe 38 and the weight of track frame assembly 36 is borne along the top surface of the shoe lift roller 58. Synchronizer roller 55 and synchronizer roller slot 56 establish and maintain horizontal positioning of the shoe 38. Stabilizer 88 maintains stability of the shoe in its three swiveling axes. Note that the shoe height from the ground in the position illustrated in FIG. 6 is greater than the length of the operating radius of crank pin 18 around the walking shaft 14.

Figure 7:
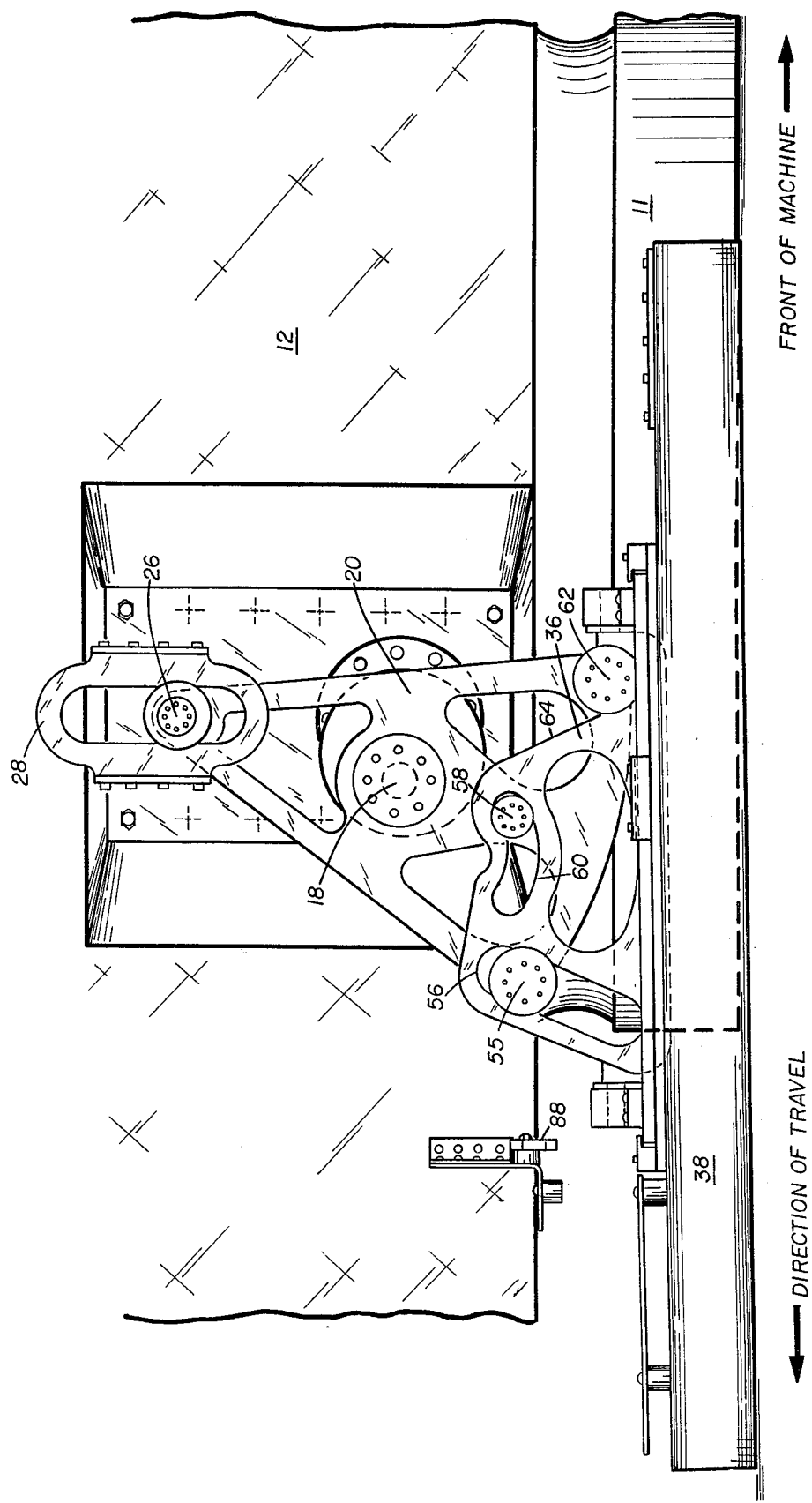
FIG. 7 is a side view of the present invention at the start of step or 90° position.

FIG. 7 is a side view of the walking device of the present invention in the start of step position with the crank pin 18 rotated 90° in a counter-clockerwise direction from the zero degree position illustrated in FIG. 6. The point at which the rim of the wheel segment 20 contacts the track surface 42 has moved from the position shown in FIG. 6 by a distance equal to approximately twice the radius of crank pin 18. Additionally, the wheel segment 20 has been lowered a distance equal to the crank pin radius while shoe lift roller 58 has moved to the front end of shoe lift roller slot 60 causing the shoe to be lowered several additional inches. Therefore, while the axis of crank pin 18 has been lowered a distance exactly equal to its operating radius, shoe 38 has been lowered a greater distance to contact the ground. Meanwhile, the roller axis pin 26 has moved downward in the axis roller slot 28 to a position slightly below the center of the slot 28. Synchronizer roller 55 is near the top of synchronizer roller slot 56 and stabilizer roller 62 is near the bottom of stabilizer roller surface 64. Further rotation of crank pin 18 causes the rim of the wheel segment 20 to press vertically down on track surface 42 at a point directly below axis roller pin 26 to lift drag line 12 vertically at the start of step.

Figure 8:
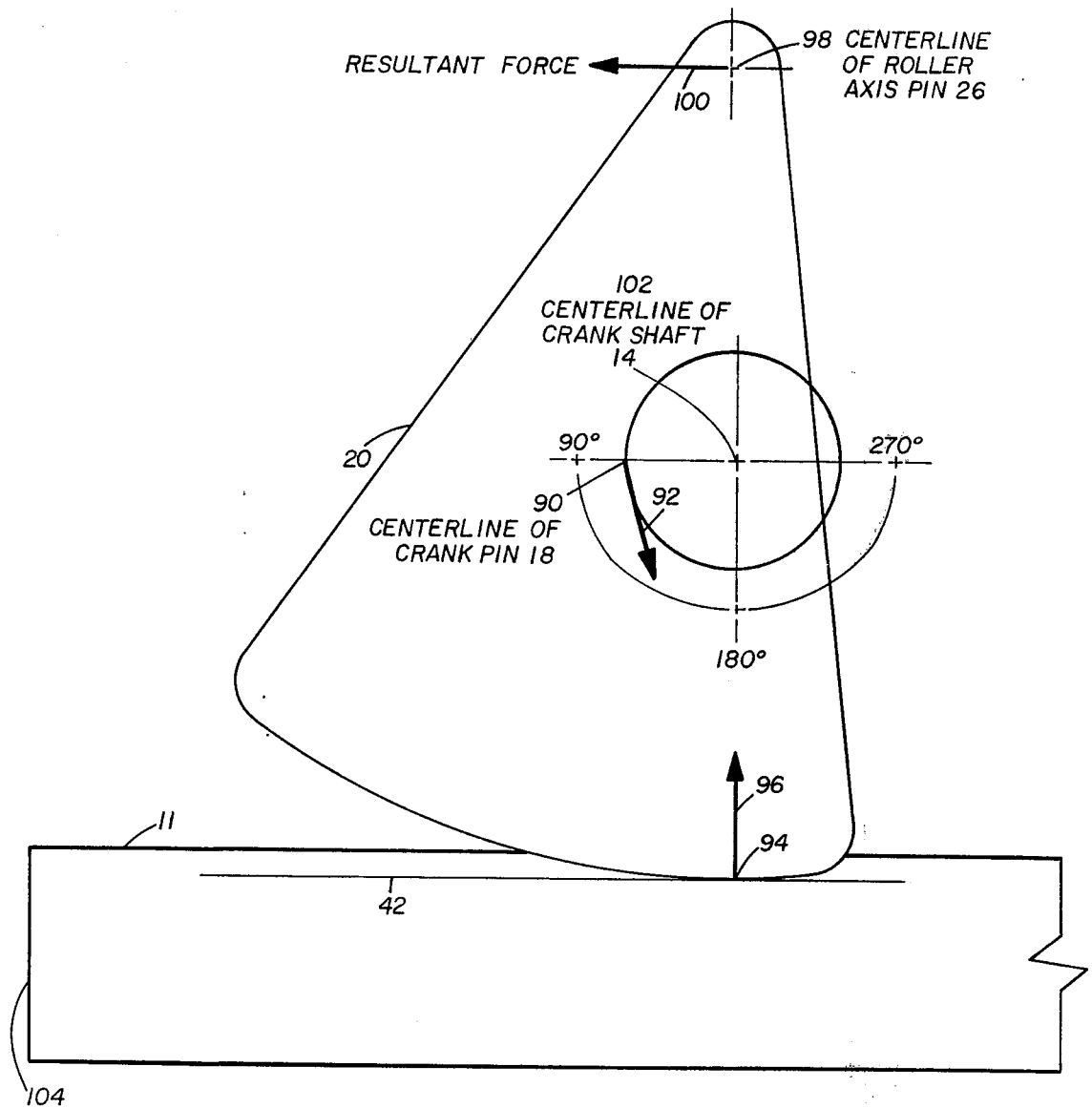
FIG. 8 is a schematic illustration of the wheel segment at the start of step or 90° position illustrated in FIG. 7.

FIG. 8 is a schematic illustration of forces applied to the wheel segment axis at the start of step or 90° position illustrated in FIG. 7. As is clear from FIG. 8, the wheel segment rim contacts the track surface 42 at a point directly below the center line of axis roller pin 26. As rotation is continued in a counter-clockwise direction, crank pin 18 applies pressure to the wheel segment 20 at point 90 in the direction of the force vector 92. As a result, track surface 42 applies pressure to the wheel segment 20 at point 94 to produce force vector 96. The result of force vectors 92 and 96 is a force vector 100 applied at point 98 in the same direction of travel, which functions to lighten tub drag pressure at the start of the step.

Figure 9:
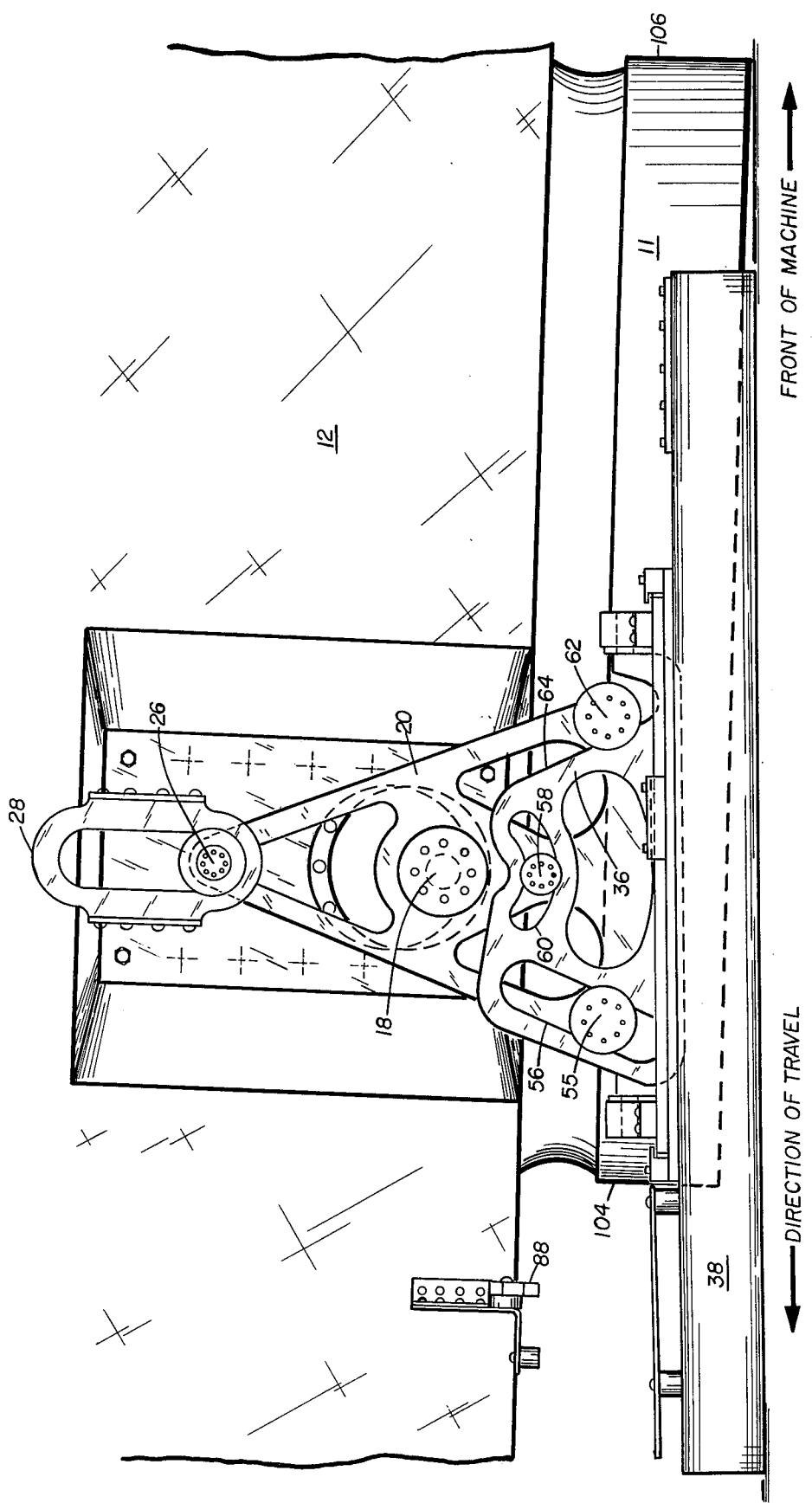
FIG. 9 is a side view of the walking device of the present invention at the middle of step or 180° position.

FIG. 9 is a side view of the walking device of the present invention in the middle of step or 180° position. Rotation of the crank pin 18 to the 180° position illustrated in FIG. 9 causes the rear edge 104 of the tub to be lifted from the ground while the front edge 106 is dragged across the ground in the direction of travel. The axis roller pin 26 has simultaneously moved to the bottom of the axis roller slot 28 while synchronizer roller 55 is disposed slightly below the center of the synchronizer roller slot 56. Shoe lift roller 58 is located at the center of the shoe lift roller slot 60 while the front stabilizer roller 62 is located slightly below the center of the stabilizer roller surface 64. Synchronizer roller 55 operating in synchronizer roller slot 56 prevents slipping or skidding of the rim of wheel segment 20 on track surface 42. The shoe lift roller 58 is not intended to contact either the upper or lower surfaces of the shoe lift roller slot 60 at midstep position. Weight of the drag line is supported by the rim of wheel segment 20 on track surface 42 directly below the center line 98 of roller axis pin 26. At mid-step or 180° crank pin position the walking shaft centerline, and consequently the drag line at that point, has been lifted a lesser distance than the length of the crankpin radius. The center of gravity of the drag line has been moved in the direction of travel, a distance equal to a portion of the step length, while the wheel segment 20 has rolled in the same direction on the track surface an equal distance. This results in no change in the horizontal distance between the center of gravity of the drag line and the support point of the walking device.

Figure 10:
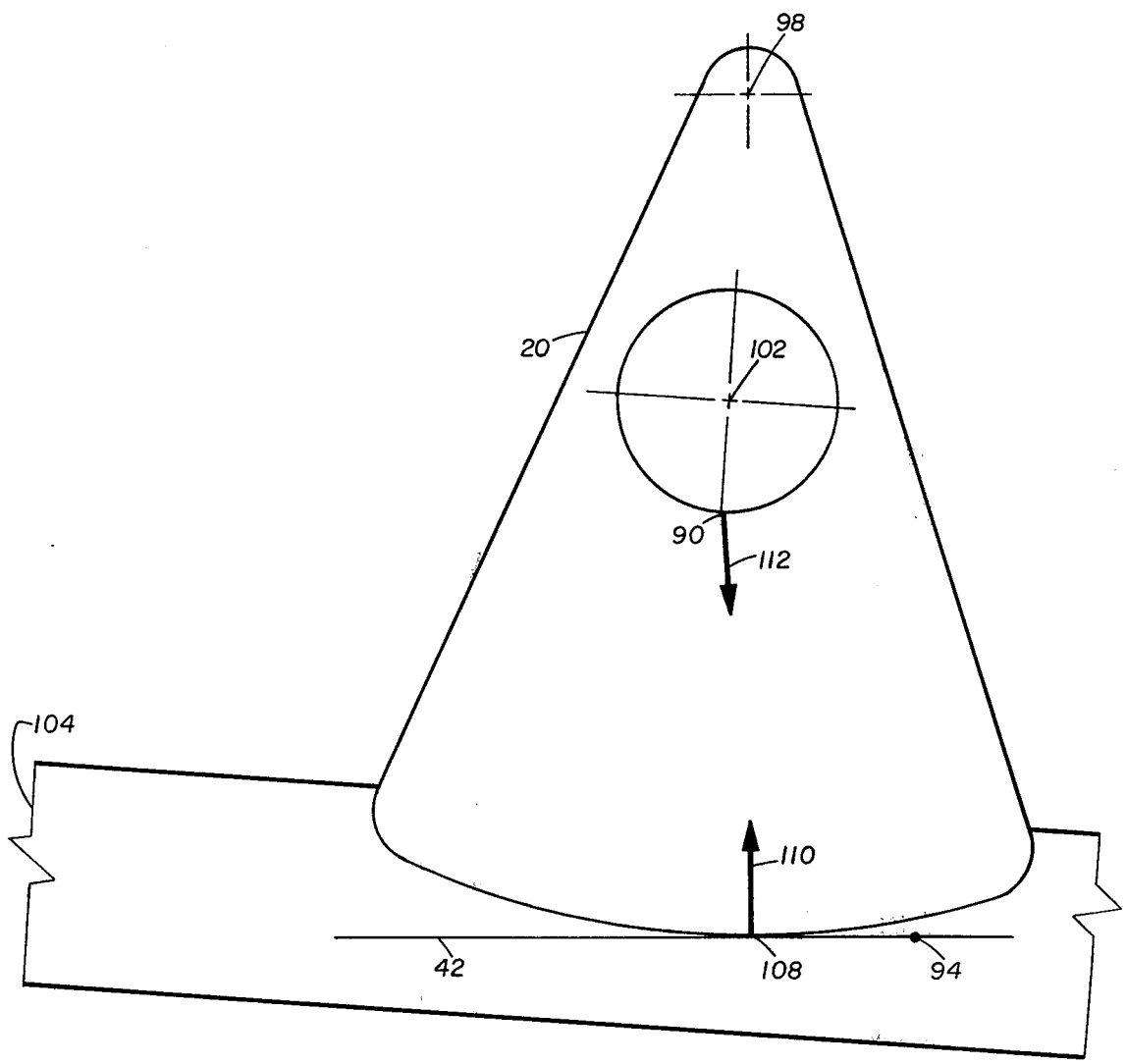
FIG. 10 is a schematic illustration of the wheel segment at the 180° position corresponding to FIG. 9.

This is more clearly shown in FIG. 10 which is a schematic illustration of the forces applied to wheel segment 20 at the middle of step or 180° position corresponding to FIG. 9. The wheel segment 20 has rotated on the segment track 42 at midstep and the rim of wheel segment 20 contacts track surface 42 at point 108, almost directly below the crank shaft axis 102. Force vectors 112 and 110 substantially oppose one another such that there is substantially neutral loading at the center line 98 of roller axis pin 26.

Figure 11:
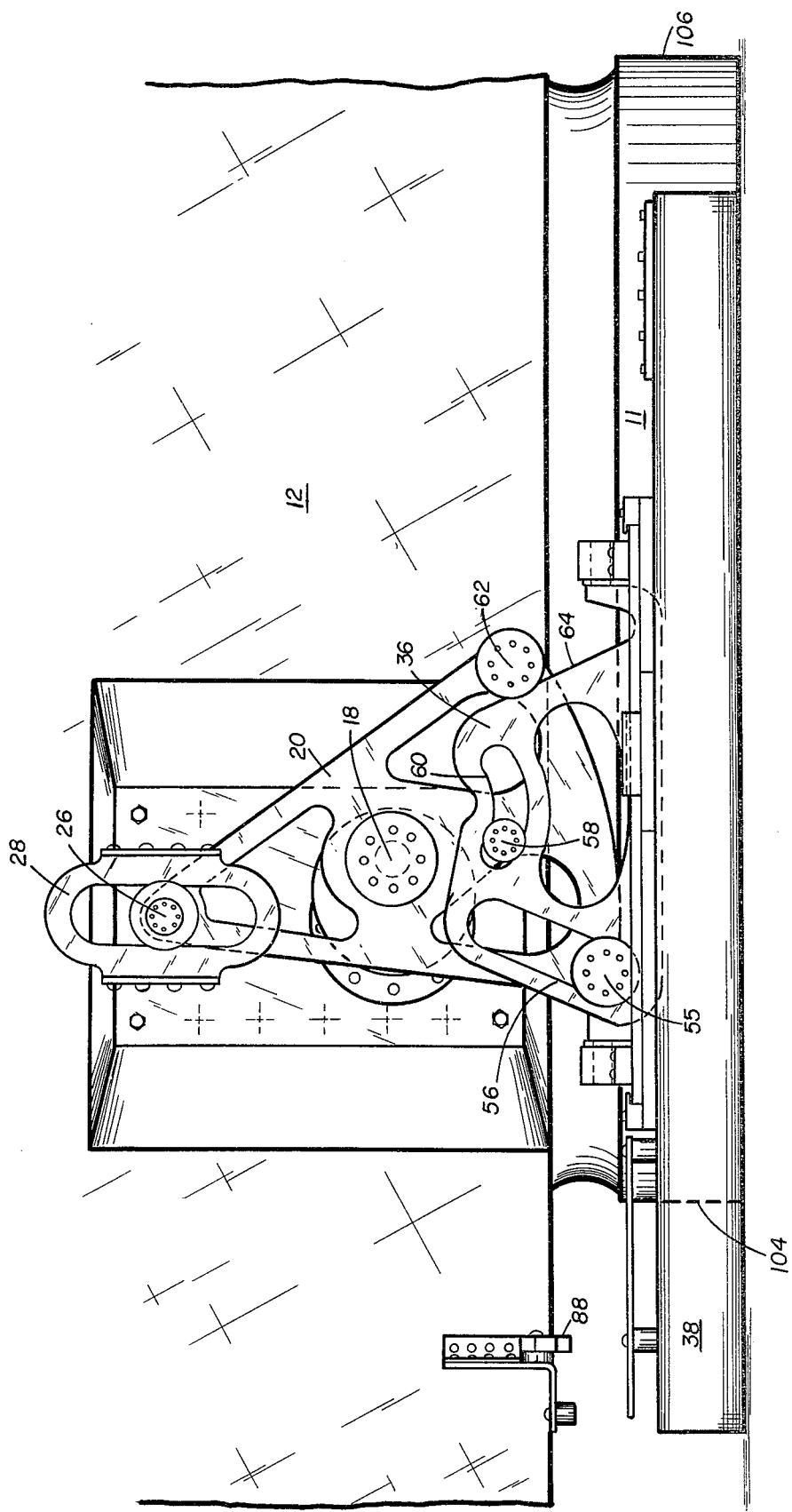
FIG. 11 is a side view of the walking device of the present invention at the end of step or 270° position.

FIG. 11 is a side view of the walking device of the present invention at the end of step or 270° position. As shown in FIG. 11, roller axis pin 26 has moved upward in axis roller slot 28 to a position slightly below the center of the slot while synchronizer roller 55 is near the lower end of synchronizer roller slot 56. Shoe lift roller 58 is positioned near the rear surface of shoe lift roller slot 60 while stabilizer roller 62 is near the upper end of stabilizer roller surface 64. At the position shown in FIG. 11, the weight of the drag line is supported by the rim of wheel segment 20 on track surface 42 at a point directly below the center line 98 of axis roller pin 26. The drag line 12 has moved in the direction of travel a full step distance while the rim of wheel segment 20 has rolled in the same direction an equal distance. Therefore, the horizontal distance between the center of gravity and the support point on the wheel segment rim has not changed. The step has been completed utilizing a full 180° rotation of crank shaft 14 and crank pin 18. Further rotation of crank pin 18 to the zero degree position releases weight from the track surface 42. Lift roller 58 contacts the upper surface of shoe lift roller slot 60 to lift the shoe from the ground.

Figure 12:
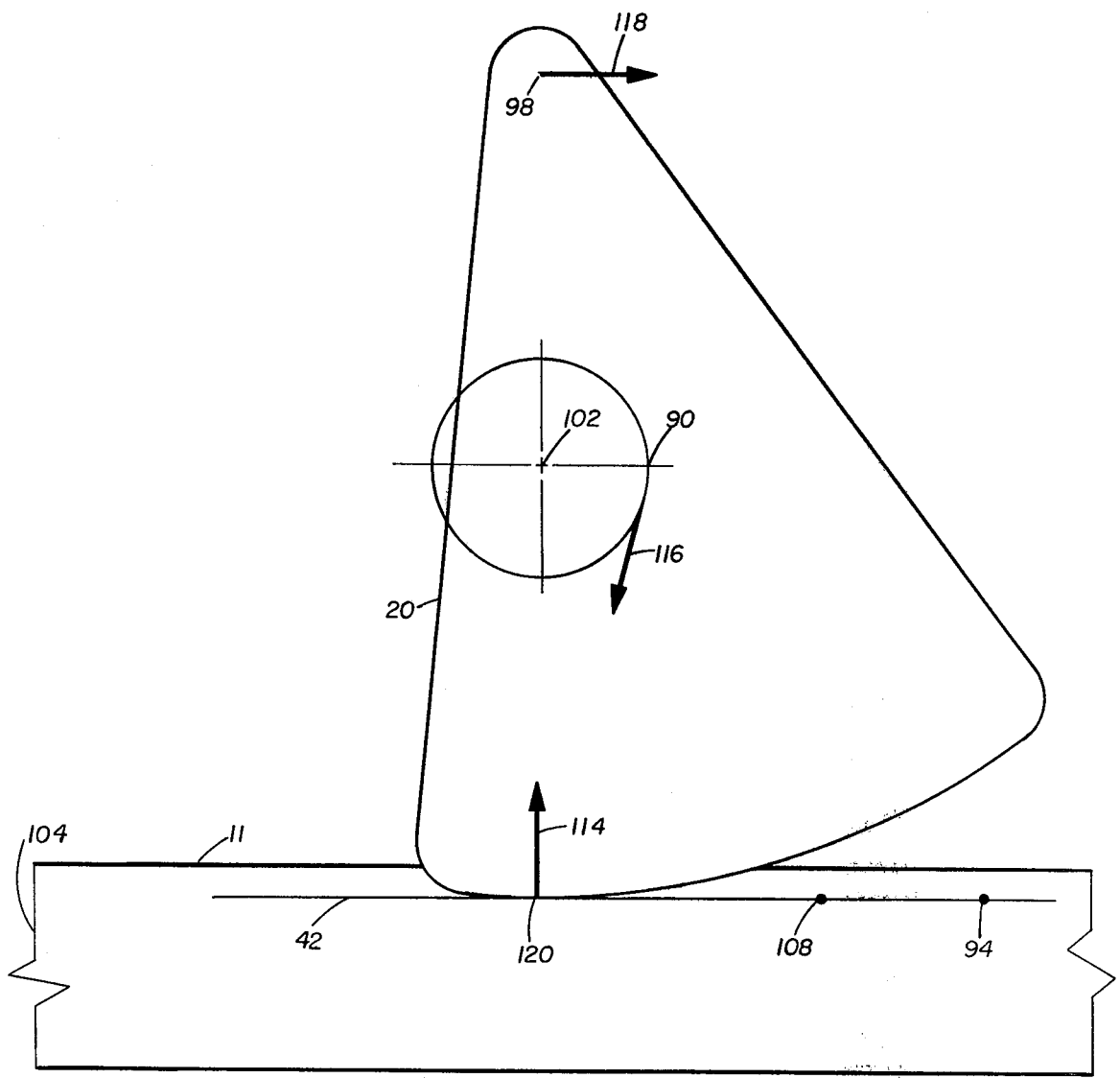
FIG. 12 is a schematic illustration of the wheel segment at the end of step or 270° position corresponding to FIG. 11.

FIG. 12 schematically illustrates the force diagram of the wheel segment at the end of step or 270° position corresponding to FIG. 11. As illustrated in FIG. 12, reverse loading on crank pin 26 at center line 90 causes a force vector 116 directed at the point of contact 120 between wheel segment 20 and track surface 42. Pressure from track surface 42 generates a force vector 114 on wheel segment 20. As a result, a force vector 118 is generated at center line 98 of roller axis pin 26 which causes increased tub drag and a gentler "set-down" of the tub 11 on the ground surface.

FIGS. 13 and 14 are a top view of the shoe 38 illustration the operation of stabilizer 88 in centering the shoe during the shoe return cycle of operation. Slots 122 and 124 illustrated in FIGS. 13 and 14 function to center the shoe by a guiding stud 126.

The present invention therefore provides a walking device which is capable of stepping machinery without changing the horizontal distance between the lifting force and the center of gravity of the machine. Additionally, the device is capable of operating on a desirable power curve and is designed to minimize shoe slippage and utilize a full 180° of crank shaft rotation to step the device. Large shoe ground clearance is provided as well as crank shaft ground clearance, and tub lifting height. The combination of large tub lifting height and stationary lifting force with respect to the center of gravity of the device provides minimal tub drag which results in efficient operation of the device. The device is fabricated in a manner to provide outside bearings for easy lubrication and is constructed of components suitable for fabrication by casting or forging or stress relieving for sufficient strength to accommodate heavy loadings.

What is desired to be secured as Letters Patent of the United States is:

1. In a walking device for moving machinery, the combination comprising:
   an oscillating wheel segment connected by a vertical axis roller slot to said walking device;
   a crankshaft assembly which rotates on a concentric axis;
   a crank pin eccentrically mounted to said crankshaft assembly and journalled in said wheel segment;
   a shoe connected to said wheel segment by a track frame assembly, whereby said crank pin imparts both horizontal and vertical motion to said wheel segment which, in turn, imparts a stepping motion to said shoe to move said machinery;
   a stabilizer roller connected to said wheel segment and disposed to roll on a stabilizer surface of said track frame assembly;
   a synchronizer roller attached to said wheel segment and journalled in a synchronizer roller slot in said track frame assembly;
   a shoe lift roller attached to said wheel segment and journalled in a shoe lift roller slot in said track frame assembly to provide vertical stability between said wheel segment and said shoes;
   whereby said stabilizer roller and said synchronizer roller provide sufficient movement about the axis of said shoe lift roller to maintain horizontal deposition of said shoes.

2. A walking device as in claim 1 further comprising trunnion journals connected between said track frame assembly and said shoes.

3. In combination, a walking device for moving machinery comprising:
   a crankshaft extending from said machinery;
   a crank pin eccentrically mounted on said crankshaft;
   a vertical axis roller slot attached to said machinery;
   a large diameter wheel segment which revolves in a reciprocal motion about a roller axis pin attached to said wheel segment and journalled in said vertical axis roller slot, said wheel segment driven by said crank pin journalled into said wheel segment;
   a track frame assembly attached to said wheel segment by a shoe lift roller which moves in a roller slot to provide horizontal placement of said track frame;
   a shoe attached to said track frame assembly by at least one trunnion journal.

4. The combination of claim 3 further comprising:
   a stabilizer roller connected to said wheel segment and disposed to roll on a stabilizer surface of said track frame assembly;
   a synchronizer roller attached to said wheel segment and journalled in a synchronizer slot in said track frame assembly.

5. The combination of claim 3 further comprising:
   a shoe toe ballast;
   a horizontal shoe stabilizer;
   a shoe centering device.

6. A walking mechanism for a mobile machine, such as an excavator, comprising:
   a base for stationary support of said machine;
   shoe means for supporting said machine when said base is lifted and horizontally translated to transport said machine from one location to another;
   a crankshaft extending from said base having a crank pin eccentrically disposed at the end of said crankshaft;
   a vertical axis roller slot attached to said machine base;
   a large diameter wheel segment having a roller axis pin journalled in said vertical axis roller slot to revolve about said roller axis pin in a reciprocal motion, said wheel segment driven by said crank pin journalled in said wheel segment;
   a track frame assembly attached to said wheel segment by a shoe lift roller journalled in a roller slot in said track frame assembly to provide horizontal placement of said track frame during said reciprocal motion of said wheel segment, said track frame assembly attached to said shoes by at least one trunnion journal aligned transversely to said rotary walking shaft.

* * * * *

UNITED STATES PATENT AND TRADEMARK OFFICE
CERTIFICATE OF CORRECTION

PATENT NO. : 4,252,204
DATED : February 24, 1981
INVENTOR(S) : John N. Bishop

It is certified that error appears in the above—identified patent and that said Letters Patent is hereby corrected as shown below:

On the title page delete "(73) Assignee. Varian Associates, Palo Alto, Calif."

On the title page, "Attorney, Agent, or Firm- Stanley Z. Cole; Peter J. Sgarbossa" should read -- Attorney, Agent, or Firm- Robert W. Weig --.

Signed and Sealed this

Twenty-sixth Day of May 1981

[SEAL]

Attest:

RENE D. TEGTMEYER

Attesting Officer

Acting Commissioner of Patents and Trademarks